US011824432B2

(12) United States Patent
He

(10) Patent No.: US 11,824,432 B2
(45) Date of Patent: Nov. 21, 2023

(54) ONLINE UPGRADING METHOD, APPARATUS AND MEDIUM FOR POWER SUPPLY

(71) Applicant: INSPUR SUZHOU INTELLIGENT TECHNOLOGY CO., LTD., Jiangsu (CN)

(72) Inventor: Chengrui He, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/038,198

(22) PCT Filed: Sep. 29, 2021

(86) PCT No.: PCT/CN2021/121879
§ 371 (c)(1),
(2) Date: May 22, 2023

(87) PCT Pub. No.: WO2022/116669
PCT Pub. Date: Jun. 9, 2022

(65) Prior Publication Data
US 2023/0327534 A1 Oct. 12, 2023

(30) Foreign Application Priority Data

Dec. 1, 2020 (CN) .......................... 202011386994.7

(51) Int. Cl.
G06F 8/65 (2018.01)
H02M 1/00 (2006.01)
H02M 3/335 (2006.01)

(52) U.S. Cl.
CPC ............ *H02M 1/0012* (2021.05); *G06F 8/65* (2013.01); *H02M 3/33546* (2013.01)

(58) Field of Classification Search
USPC ......................................................... 717/171
See application file for complete search history.

(56) References Cited

U.S. PATENT DOCUMENTS 11,055,080 B2 * 7/2021 Kazi ....................... G11C 16/30
2011/0184578 A1 * 7/2011 Elwell .................... H01H 47/02
361/170

(Continued)

FOREIGN PATENT DOCUMENTS

CN 101595442 A 12/2009
CN 104021014 A 9/2014
(Continued)

*Primary Examiner* — Qing Chen
*Assistant Examiner* — Clint Thatcher
(74) *Attorney, Agent, or Firm* — IPro, PLLC

(57) ABSTRACT

An online upgrading method for a power supply, capable of enabling the power supply to simultaneously perform work output in the process of upgrading the power supply without using two sets of power supplies, and including: S1, determining whether the power supply needs to be corrected, and if the power supply needs to be corrected, sending an upgrading request to a master control chip; S2, the master control chip turning off any transformer in the power supply and sending a starting instruction to a secondary control chip, and the secondary control chip controlling the power supply to enter an upgrading mode according to the starting instruction; S3, when the power supply enters the upgrading mode, the power supply transmitting upgrading data to the secondary control chip by means of a transmission protocol.

20 Claims, 3 Drawing Sheets

(56) References Cited

U.S. PATENT DOCUMENTS

| | | | | |
|---|---|---|---|---|
| 2012/0239920 A1* | 9/2012 | Yang | ............... | G06F 8/65 |
| | | | | 713/2 |
| 2014/0059533 A1* | 2/2014 | Calder | ............... | H04L 41/082 |
| | | | | 717/171 |
| 2016/0181917 A1* | 6/2016 | Jäntti | ............... | H02M 3/285 |
| | | | | 323/271 |

FOREIGN PATENT DOCUMENTS

| | | | |
|---|---|---|---|
| CN | 104281558 | A | 1/2015 |
| CN | 106293824 | A | 1/2017 |
| CN | 107562493 | A | 1/2018 |
| CN | 107765585 | A | 3/2018 |
| CN | 112666919 | A | 4/2021 |
| IN | 106547592 | A | 3/2017 |
| WO | 2016001721 | A1 | 1/2016 |

* cited by examiner

ONLINE UPGRADING METHOD, APPARATUS AND MEDIUM FOR POWER SUPPLY

CROSS-REFERENCE TO RELATED APPLICATION

The present disclosure claims the priority of the Chinese patent application filed on Dec. 1, 2020 before the China National Intellectual Property Administration with the application number of 202011386994.7 and the title of "METHOD FOR ONLINE UPGRADING POWER SUPPLY, APPARATUS AND MEDIUM", which is incorporated herein in its entirety by reference.

FIELD

The present disclosure relates to the technical field of power supply control and, more particularly, to a method for online upgrading power supply, an apparatus and a medium.

BACKGROUND

In a conventional power supply, there are two sets of transformers to convert the input voltage, and the two sets of transformers are controlled by one control chip. When the power supply needs to correct the output voltage, the control chip needs to upgrade the power supply online. At this time, since the power supply must close the output during the online upgrading process, the existing equalization scheme is that two sets of power supplies are used, that is, when one set of power supply is upgraded, the other set of power supply is used for outputting. In this way, the use cost of the power supply in the use process may be greatly increased, and the power supply cannot be used flexibly, therefore the stability of the power supply is reduced.

SUMMARY

The main technical problem to be solved in the present disclosure is to provide a method for online upgrading power supply, an apparatus and a medium, which may solve the problem that the power output cannot be simultaneously performed in the process of upgrading the power supply.

In order to solve the problem stated above, a technical solution adopted in the present disclosure is a method for online upgrading a power supply, including:
  step 1, determining whether the power supply needs to be corrected, when the power supply needs to be corrected, sending an upgrading request to a master control chip;
  step 2, the master control chip turning off any one of a plurality of transformers in the power supply, and sending a starting instruction to a secondary control chip, and the secondary control chip controlling the power supply to enter an upgrading mode according to the starting instruction;
  step 3, when the power supply enters the upgrading mode, the power supply transmitting upgrading data to the secondary control chip through a transmission protocol;
  step 4, the secondary control chip determining whether the upgrading data is correct, and when the upgrading data is correct, the secondary control chip obtaining a confirmation waveform of the power supply; and
  step 5, according to the confirmation waveform, the secondary control chip obtaining a synchronous period corresponding to the confirmation waveform, and upgrading the power supply according to the synchronous period.

Further, in the step 1, when the master control chip receives the upgrading request, the master control chip turns off any one of the plurality of transformers in the power supply;
  after any one of the plurality of transformers in the power supply is turned off, the power supply outputs power through one of the other transformers that is not turned off; and
  after receiving the starting instruction, the secondary control chip is started, and sends the upgrading instruction to the power supply, after the power supply receives the upgrading instruction, the power supply enters the upgrading mode.

Further, in the step 3, when the upgrading data is completely transmitted, the power supply sends an upgrading preparation signal to the secondary control chip, and after the secondary control chip receives the upgrading preparation signal, a judgment mechanism is triggered; and
  the upgrading data includes: performance index data of the power supply and a data volume checking code.
  Further, the judgment mechanism is that:
  the secondary control chip calculates a data volume of the performance index data in the upgrading data to obtain an upgrading data volume, and the upgrading data volume is compared with a data volume in the data volume checking code in the upgrading data, when the upgrading data volume is the same as the data volume in the data volume checking code, the secondary control chip determines that the upgrading data is correct.

Further, in the step 4, the step of the secondary control chip obtaining the confirmation waveform of the power supply includes: the secondary control chip sending a waveform obtaining signal to the power supply; and
  when the power supply receives the waveform obtaining signal, the power supply sending the confirmation waveform corresponding to the waveform obtaining signal to the secondary control chip.

Further, the secondary control chip obtains a synchronous period corresponding to a frequency of the confirmation waveform through the frequency of the confirmation waveform, and the secondary control chip sends the confirmation waveform with a frequency corresponding to the synchronous period to the master control chip; and the power supply are upgraded according to the synchronous period; and
  the synchronous period is a reciprocal of the frequency of the confirmation waveform.

In the step 5, after the synchronous period, upgrading power supply by the secondary control chip is completed, and the master control chip turns on the transformer turned off in the step S2, control contents of the secondary control chip and the master control chip alternate; and
  the control contents include: controlling any one of the plurality of transformers to be turned off and turned on, and to upgrade the power supply.

Further, in the step 3, through a protocol address, the secondary control chip receives the upgrading data sent by the power supply through the transmission protocol.

An apparatus for online upgrading a power supply, including:
  an upgrading control module and an upgrading request module, and the upgrading control module is connected to the power supply, the upgrading request module is disposed on the power supply;

the upgrading control module includes a master control chip and a secondary control chip connected to each other; the upgrading request module includes a correcting control module, an upgrading preparation signal sending module and a power waveform interface;

the master control chip and the secondary control chip have a same structure, and both include an upgrading instruction sending module, a data identification module, a checking module and a chip waveform interface;

the master control chip and the secondary control chip are configured for upgrading the power supply; the upgrading instruction sending module is configured for sending an upgrading instruction to the power supply; the data identification module is configured for receiving the upgrading data; the checking module is configured for determining whether the upgrading data is correct; the chip waveform interface is configured for sending a waveform obtaining signal to the power supply and receiving a confirmation waveform, and according to a frequency of the confirmation waveform, obtaining a synchronous period, and sending the confirmation waveform with a frequency corresponding to the synchronous period to a corresponding control chip; and the correcting control module is configured for determining whether the power supply needs to be corrected, when the power supply needs to be corrected, sending an upgrading request to a master control chip; the upgrading preparation signal sending module is configured for sending upgrading preparation signal; and the power waveform interface is configured for sending the confirmation waveform.

A medium for online upgrading a power supply, wherein the medium is configured for storing software instructions used in the method for online upgrading power supply, and the medium includes a program designed for the method for online upgrading power supply.

The beneficial effects of the present disclosure is as follows: in the present disclosure, without using two sets of power supplies, the power supply may simultaneously perform work output in the process of upgrading, the use cost of the power supply is reduced, the usage of the power supply may be more elastically, and the stability of the power supply is improved.

DETAILED DESCRIPTION

The better embodiments of the present disclosure are described below in detail in combination with the drawings, so that the advantages and characteristics of the present disclosure may be more easily understood by those skilled in the art, to make a clearer and more explicitly definition to the scope of protection of the present disclosure.

Figure 1:
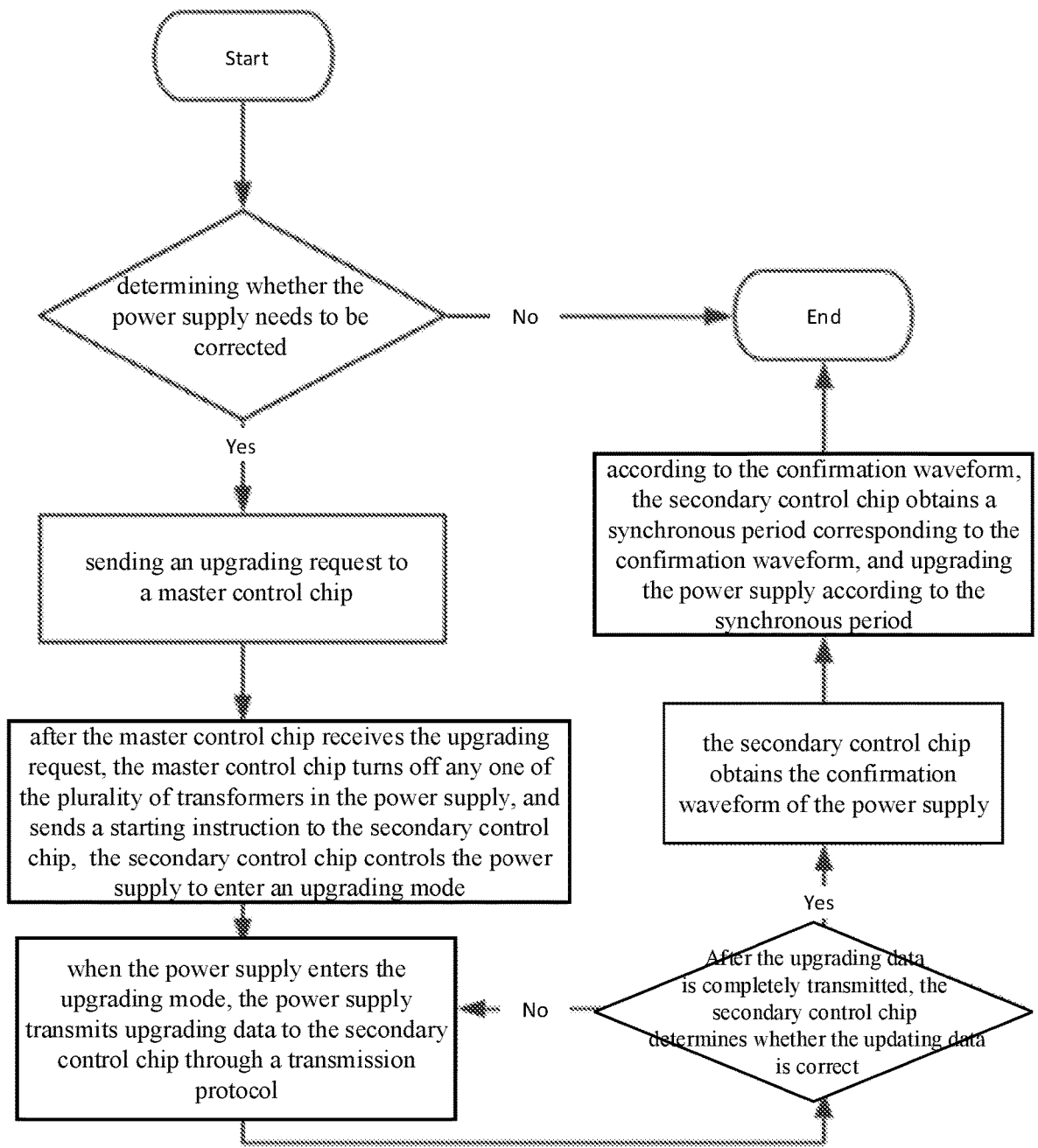
FIG. 1 is a flow chart of a method for online upgrading a power supply according to the present disclosure.

The embodiments of the present disclosure include:

In the first aspect, referring to FIG. 1, a method for online upgrading a power supply, including:

a correcting control module detects whether the power supply needs to be corrected, when the power supply needs to be corrected, the correcting control module sends an upgrading request to a master control chip; after the master control chip receives the upgrading request, the master control chip turns off the transformer T2 of the power supply, and sends a starting instruction to the secondary control chip. At this time, the master control chip controls that the transformer T1 of the power supply connected to the secondary control chip continues to work, the secondary control chip starts and performs the step of upgrading the power supply, and the power supply continues outputting.

The step of upgrading is: an upgrading instruction sending module of the secondary control chip sends an upgrading instruction to the power supply, the power supply receives the upgrading instruction and then enters an upgrading mode. When the power supply enters the upgrading mode, the power supply transmits the upgrading data through the PMBus protocol (i.e. transmission protocol) to the secondary control chip. Both the secondary control chip and the master control chip have corresponding data identification modules. The data identification module has a protocol address corresponding to the PMBus protocol thereon, and the data identification module receives the upgrading data through the protocol address.

The performance index data and the data volume checking code of items of the power supply are included in the upgrading data. Under the upgrading mode, the transmission of the upgrading data of the power supply and the outputting and the power supplying of the power supply do not affect each other and are simultaneously performed.

When the upgrading data of the power supply is completely sent, the upgrading preparation signal sending module of the power supply sends the upgrading preparation signal to the secondary control chip. When the secondary control chip receives the upgrading preparation signal, the judgment mechanism is triggered. The judgment mechanism is:

the secondary control chip determines whether the upgrading data is correct. The steps are as follows:

the checking module of the secondary control chip calculates the value of the data volume of the performance index data of items in the upgrading data to obtain the upgrading data volume, and compares the upgrading data volume with the data volume checking code in the upgrading data. When the upgrading data volume is the same as the data volume checking code, the correctness of the upgrading data is correct.

When the correctness of the system is correct, the control general-purpose input/output GPIO interface of the secondary control chip sends a waveform obtaining signal to the power supply. The power supply may send a confirmation waveform through its own power GPIO interface. The control GPIO interface of the secondary control chip obtains the synchronous period 1/f through the frequency f of the confirmation waveform. The confirmation waveform with a frequency corresponding to the synchronous period is sent to the master control chip, and the master control chip obtains the synchronous period corresponding to the confirmation waveform by using the same method through the control GPIO interface of the master control chip.

The secondary control chip upgrades the power supply. At this time, after the synchronous period 1/f, the secondary control chip completes the upgrading of the power supply, and the control contents of the two chips are converted. The secondary control chip is responsible for controlling to turn on and turn off the transformer connected to the secondary control chip. The master control chip is responsible for receiving the upgrading data and upgrading the power supply.

Figure 2:
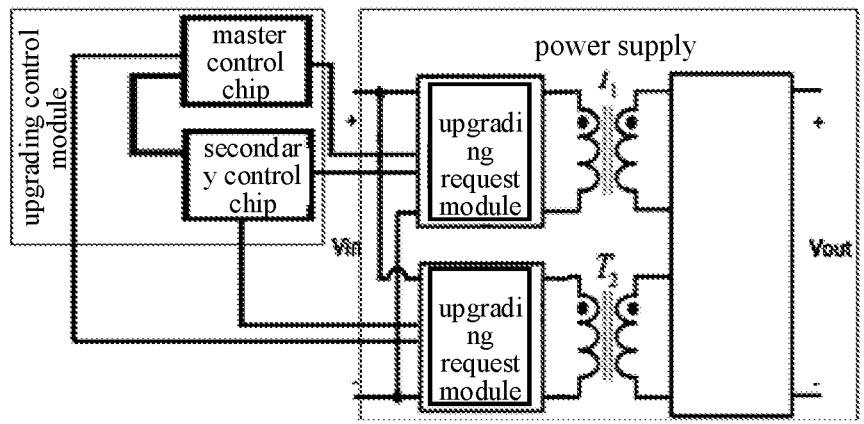
FIG. 2 is a schematic diagram showing a structure of an apparatus for online upgrading a power supply according to the present disclosure.
Figure 3:
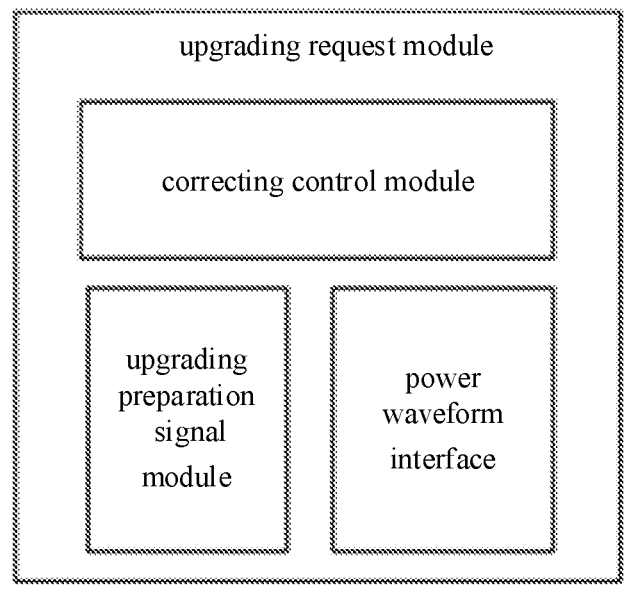
FIG. 3 is a schematic diagram showing a structure of an upgrading request module of the apparatus for online upgrading the power supply according to the present disclosure.
Figure 4:
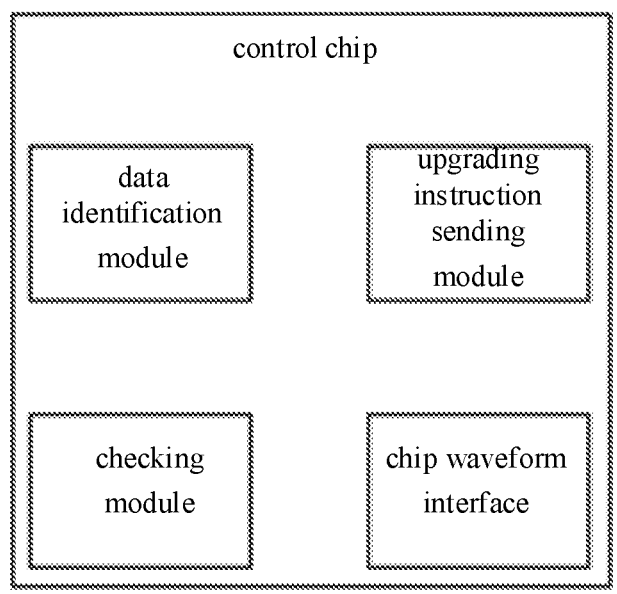
FIG. 4 is a schematic diagram showing a structure of a control chip of the apparatus for online upgrading the power supply according to the present disclosure.

In the second aspect, referring to FIG. 2 to FIG. 4, on the basis of the same application concept to the method for online upgrading the power supply in the embodiments stated above, the embodiments of the specification further provide an apparatus for online upgrading a power supply, including:

an upgrading control module and an upgrading request module;

the upgrading control module includes a master control chip and a secondary control chip connected to each other;

the upgrading request module includes a correcting control module, an upgrading preparation signal sending module and a power waveform interface;

the upgrading control module is connected to the power supply, the upgrading request module is disposed on the transformers of the power supply;

the master control chip and the secondary control chip have a same structure, and include an upgrading instruction sending module, a data identification module, a checking module and a chip waveform interface;

The interfaces that may control to send, receive and generate waveforms may be used, in the present embodiment, the interfaces used are all GPIO interfaces.

In the upgrading control module:

the master control chip and the secondary control chip are configured for upgrading the power supply; the upgrading instruction sending module is configured for sending an upgrading instruction to the power supply; the data identification module is configured for receiving the upgrading data; the checking module is configured for determining whether the upgrading data is correct; the chip waveform interface is configured for sending a waveform obtaining signal to the power supply and receiving a confirmation waveform, and according to a frequency of the confirmation waveform, obtaining a synchronous period, and sending the confirmation waveform to the control chip.

In the upgrading request module:

the correcting control module is configured for determining whether the power supply needs to be corrected, when the power supply needs to be corrected, sending an upgrading request to a master control chip; the upgrading preparation signal sending module is configured for sending upgrading preparation signal; and the power waveform interface is configured for sending the confirmation waveform.

In the third aspect, on the basis of the same application concept to the method for online upgrading the power supply in the embodiments stated above, the embodiments of the specification further provide a medium for online upgrading a power supply, wherein the medium is configured for storing software instructions used in the method for online upgrading power supply according, and the medium includes a program designed for the method for online upgrading power supply.

Different from the prior art, according to a method for online upgrading the power supply, an apparatus and a medium of the present disclosure, by cooperating two control chips with each other, when the power supply is upgraded online, the outputting of the power supply may be not turned off, the use cost of the power supply may be reduced and the stability of the power supply may be improved.

The above mentioned is only the embodiments of the present disclosure, which does not limit the patent scope of the present disclosure. Any equivalent structure or equivalent process transformation made by using the contents of the description and drawings of the present disclosure, or directly or indirectly used in other related arts, is equally included in the patent protection scope of the present disclosure.

The invention claimed is:

1. A method for online upgrading a power supply, comprising:

S1, determining whether the power supply needs to be corrected, when the power supply needs to be corrected, sending an upgrading request to a master control chip;

S2, the master control chip turning off any one of a plurality of transformers in the power supply, and sending a starting instruction to a secondary control chip, and the secondary control chip controlling the power supply to enter an upgrading mode according to the starting instruction;

S3, when the power supply enters the upgrading mode, the power supply transmitting upgrading data to the secondary control chip through a transmission protocol;

S4, the secondary control chip determining whether the upgrading data is correct, and when the upgrading data is correct, the secondary control chip obtaining a confirmation waveform of the power supply; and S5, according to the confirmation waveform, the secondary control chip obtaining a synchronous period corresponding to the confirmation waveform, and upgrading the power supply according to the synchronous period.

2. The method for online upgrading the power supply according to claim 1, wherein in the step S2, when the master control chip receives the upgrading request, the master control chip turns off any one of the plurality of transformers in the power supply;

after any one of the plurality of transformers in the power supply is turned off, the power supply outputs power through one of the other transformers that is not turned off; and after receiving the starting instruction, the secondary control chip is started, and sends the upgrading instruction to the power supply, after the power supply receives the upgrading instruction, the power supply enters the upgrading mode.

3. The method for online upgrading the power supply according to claim 1, wherein in the step S3, when the upgrading data is completely transmitted, the power supply sends an upgrading preparation signal to the secondary control chip, and after the secondary control chip receives the upgrading preparation signal, a judgment mechanism is triggered; and the upgrading data comprises: performance index data of the power supply and a data volume checking code.

4. The method for online upgrading the power supply according to claim 3, wherein the judgment mechanism is that:

the secondary control chip calculates a data volume of the performance index data in the upgrading data to obtain an upgrading data volume, and the upgrading data volume is compared with a data volume in the data volume checking code in the upgrading data, when the upgrading data volume is the same as the data volume in the data volume checking code, the secondary control chip determines that the upgrading data is correct.

5. The method for online upgrading the power supply according to claim 1, wherein in the step S4, the step of the secondary control chip obtaining the confirmation waveform of the power supply comprises: the secondary control chip sending a waveform obtaining signal to the power supply; and when the power supply receives the waveform obtaining signal, the power supply sending the confirmation waveform corresponding to the waveform obtaining signal to the secondary control chip.

6. The method for online upgrading the power supply according to claim 5, wherein the secondary control chip obtains a synchronous period corresponding to a frequency of the confirmation waveform through the frequency of the confirmation waveform, and the secondary control chip sends the confirmation waveform with a frequency corresponding to the synchronous period to the master control chip; and the power supply are upgraded according to the synchronous period; and the synchronous period is a reciprocal of the frequency of the confirmation waveform.

7. The method for online upgrading the power supply according to claim 6, wherein in the step S5, after the synchronous period, upgrading power supply by the secondary control chip is completed, and the master control chip turns on the transformer turned off in the step S2, control contents of the secondary control chip and the master control chip alternate; and the control contents comprise: controlling any one of the plurality of transformers in the power supply to be turned off and turned on, and to upgrade the power supply.

8. The method for online upgrading the power supply according to claim 1, wherein in the step S3, through a protocol address, the secondary control chip receives the upgrading data sent by the power supply through the transmission protocol.

9. An apparatus for online upgrading a power supply, comprising:
a memory storing a computer readable code therein; and
one or more processors, when the computer readable code being executed by the one or more processors, the apparatus for online upgrading the power supply implements the operations as follows:
determining whether the power supply needs to be corrected, when the power supply needs to be corrected, sending an upgrading request to a master control chip;
the master control chip turning off any one of a plurality of transformers in the power supply, and sending a starting instruction to a secondary control chip, and the secondary control chip controlling the power supply to enter an upgrading mode according to the starting instruction:
when the power supply enters the upgrading mode, the power supply transmitting upgrading data to the secondary control chip through a transmission protocol;
the secondary control chip determining whether the upgrading data is correct, and when the upgrading data is correct, the secondary control chip obtaining a confirmation waveform of the power supply; and
according to the confirmation waveform, the secondary control chip obtaining a synchronous period corresponding to the confirmation waveform, and upgrading the power supply according to the synchronous period.

10. A non-transitory, computer-readable storage medium for online upgrading a power supply, wherein the medium is configured for storing software instructions used in the method for online upgrading power supply according to claim 1, and the medium comprises a program designed for the method for online upgrading power supply.

11. The method for online upgrading the power supply according to claim 2, wherein when the master control chip sends the starting instruction to the secondary control chip, the master control chip controls that a transformer of the power supply connected to the secondary control chip continues to work, the secondary control chip starts and performs the step of upgrading the power supply, and the power supply continues outputting.

12. The method for online upgrading the power supply according to claim 2, wherein under the upgrading mode, the transmission of the upgrading data of the power supply and the outputting power of the power supply are simultaneously performed.

13. The non-transitory, computer-readable storage medium for online upgrading the power supply according to claim 10, wherein in the step S2, when the master control chip receives the upgrading request, the master control chip turns off any one of the plurality of transformers in the power supply;
after any one of the plurality of transformers in the power supply is turned off, the power supply outputs power through one of the other transformers that is not turned off; and
after receiving the starting instruction, the secondary control chip is started, and sends the upgrading instruction to the power supply, after the power supply receives the upgrading instruction, the power supply enters the upgrading mode.

14. The non-transitory, computer-readable storage medium for online upgrading the power supply according to claim 10, wherein in the step S3, when the upgrading data is completely transmitted, the power supply sends an upgrading preparation signal to the secondary control chip, and after the secondary control chip receives the upgrading preparation signal, a judgment mechanism is triggered; and
the upgrading data comprises: performance index data of the power supply and a data volume checking code.

15. The non-transitory, computer-readable storage medium for online upgrading the power supply according to claim 14, wherein the judgment mechanism is that:
the secondary control chip calculates a data volume of the performance index data in the upgrading data to obtain an upgrading data volume, and the upgrading data volume is compared with a data volume in the data volume checking code in the upgrading data, when the upgrading data volume is the same as the data volume in the data volume checking code, the secondary control chip determines that the upgrading data is correct.

16. The non-transitory, computer-readable storage medium for online upgrading the power supply according to claim 10, wherein in the step S4, the step of the secondary control chip obtaining the confirmation waveform of the power supply comprises: the secondary control chip sending a waveform obtaining signal to the power supply; and when the power supply receives the waveform obtaining signal, the power supply sending the confirmation waveform corresponding to the waveform obtaining signal to the secondary control chip.

17. The non-transitory, computer-readable storage medium for online upgrading the power supply according to claim 16, wherein the secondary control chip obtains a synchronous period corresponding to a frequency of the confirmation waveform through the frequency of the confirmation waveform, and the secondary control chip sends the confirmation waveform with a frequency corresponding to the synchronous period to the master control chip; and the power supply are upgraded according to the synchronous period; and the synchronous period is a reciprocal of the frequency of the confirmation waveform.

18. The non-transitory, computer-readable storage medium for online upgrading the power supply according to claim 17, wherein in the step S5, after the synchronous period, upgrading power supply by the secondary control chip is completed, and the master control chip turns on the transformer turned off in the step S2, control contents of the secondary control chip and the master control chip alternate; and the control contents comprise: controlling any one of the plurality of transformers in the power supply to be turned off and turned on, and to upgrade the power supply.

19. The non-transitory, computer-readable storage medium for online upgrading the power supply according to claim 10, wherein in the step S3, through a protocol address, the secondary control chip receives the upgrading data sent by the power supply through the transmission protocol.

20. The non-transitory, computer-readable storage medium for online upgrading the power supply according to claim 13, wherein when the master control chip sends the starting instruction to the secondary control chip, the master control chip controls that a transformer of the power supply connected to the secondary control chip continues to work, the secondary control chip starts and performs the step of upgrading the power supply, and the power supply continues outputting.

* * * * *